United States Patent [19]
Papadopoulos et al.

[11] 3,744,712
[45] July 10, 1973

[54] PARTICIPATION PRESENTER-AUDIENCE REACTION SYSTEM

[76] Inventors: Demetrios Panagiotou Papadopoulos, 2216 West First Avenue; Thomas Leslie Westbrook, W. 1004–18th, both of Spokane, Wash. 99204

[22] Filed: June 12, 1972

[21] Appl. No.: 261,979

[52] U.S. Cl. .................. 235/52, 346/37, 35/48 R
[51] Int. Cl. ............................................. G07c 13/00
[58] Field of Search .................. 235/52; 346/37, 49; 179/2 AS; 35/9 B, 9 C, 48 R, 48 B, 5; 340/332

[56] References Cited
UNITED STATES PATENTS

| | | | |
|---|---|---|---|
| 2,712,976 | 7/1955 | Blaustein et al. | 346/37 X |
| 2,878,996 | 3/1959 | Millard, Jr. | 235/52 |
| 3,190,014 | 6/1965 | Rhodes | 235/52 X |
| 3,318,517 | 5/1967 | Wells | 235/52 |
| 3,319,254 | 5/1967 | Rice et al. | 346/37 |
| 3,378,194 | 4/1968 | Wells | 235/52 |

*Primary Examiner*—Stephen J. Tomsky
*Attorney*—Greek Wells, David P. Roberts et al.

[57] ABSTRACT

A system is described for measuring the response of selected members of an audience, averaging the selected responses and presenting the average to the presenter as the presentation is being made to enable the presenter to adjust his presentation accordingly or respond to the audience response. The system includes a plurality of electrical response circuits having variable resistance manually operable devices individually distributable to the audience. Input resistors are included in each response circuit having resistance values at least 10 times greater than the maximum resistance of its variable resistance devices. The system includes switching means for placing selected response circuits in parallel with each other to a common line in series with an operational amplifier. The system includes a plurality of feedback resistors corresponding to the response circuits with the corresponding feedback resistors being placed in parallel with the amplifier to provide an output signal from the amplifier equal to the average of the selected response signals. It is important that the total feedback resistance placed in parallel with the operational amplifier is substantially equal to the total resistance of the selected response circuits. The output signal is transmitted to a readout device at the presenter's console or lectern to provide the presenter with a continuous reading of the audience's reaction to his presentation.

8 Claims, 5 Drawing Figures

PARTICIPATION PRESENTER-AUDIENCE REACTION SYSTEM

BACKGROUND OF THE INVENTION

This invention relates to systems that enable an audience to participate and to feedback their responses to the presenter during his presentation.

Many audience or consumer approval or disapproval systems have been developed. The early evaluation systems included audience applause or laughter sound measuring devices, many of which are still presently used in connection with "live" performances. Generally the applause devices are utilized to obtain the gross response of the audience at the conclusion of a performance. The laughter sound measuring devices may be helpful and provide feedback to a comedian during his presentation to enable the comedian to readily determine the acceptability of his material.

Additional sophisticated audience reaction measuring systems have been employed for rating pilot television shows and movies in which rather complete analysis of the reaction of the audience is obtained. Examples of such devices are disclosed in U.S. Pat. Nos.: 3,319,254 to Rice, 3,328,803 to Schwerin, 3,378,194 to Wells, 2,712,976 to Blaustein, 3,034,500 to Blackster, 2,514,086 to Owens, 3,126,513 to Kamen, 3,318,517 to Wells, 2,878,996 to Millard, 2,092,119 to Hopkins.

Most of such devices are rather complicated and expensive and do not lend themselves for use by a rather large segment of our society. Most of the successful devices are owned and operated by large television or movie studios. Furthermore, such devices do not involve the person making the presentation to enable the presenter to react during his presentation to the audience response to provide a continuing dialogue between the presenter and audience. Furthermore such devices do not permit the presenter to elicit information from the audience during the performance.

There is a significant need for an inexpensive participation presenter-audience reaction system in which the person or persons making the presentation is cognizant of the audience's reaction to his presentation so that the presenter may himself respond to the audience's reaction. Almost all other recording or measuring systems do not feed back the response to the presenter to enable the presenter to respond to the audience's reaction to provide for a full circle of dialogue. Such need is particularly evident in the classroom, where it may be the objective to improve or perfect the presentation. It is also particularly useful to enable persons who make presentations such as politicians to test their presentation and to obtain meaningful dialogue with the audience to perfect their presentations.

Thus it is one of the principal objects of this invention to provide a participation presenter-audience reaction system in which the audience response is simultaneously displayed before the person or persons making the presentation so that the presenter may respond to the audience's reaction or modify his presentation accordingly or elicit information from the audience.

An additional object of this invention is to provide a participation presenter-audience reaction system that is quite condensed and may be utilized as a portable unit for transporting from one location to another such as from classroom to classroom as the needs develop.

A further object of this invention is to provide a participation presenter-audience reaction system that may be rather easily constructed and available at a rather moderate price to enable speech and drama instructors and professors to utilize the system as a research and educational tool in the classroom.

An additional object of this invention is to provide such a system that will lend itself to a portable mode for transportation to different locations to increase its versatility.

These and other objects and advantages of this invention will become apparent upon reading of the following detailed description of a preferred and alternate embodiment.

BRIEF DESCRIPTION OF THE DRAWINGS

A preferred and alternate embodiment of this invention is illustrated in the accompanying drawings, in which.

DETAILED DESCRIPTION OF A PREFERRED AND ALTERNATE EMBODIMENT

Figure 1:
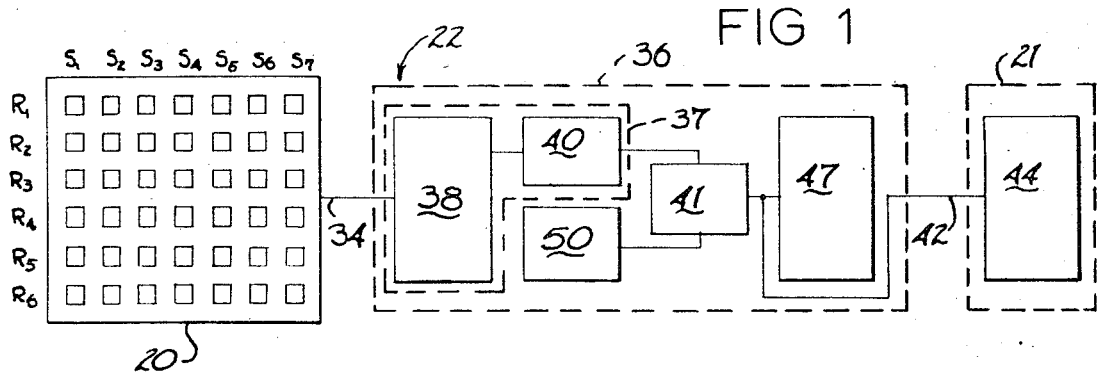
FIG. 1 is a functional block diagram of a participation presentation-audience reaction system embodying the principal features of this invention.

Referring now in detail to the drawings, there is illustrated in FIG. 1 in functional block diagram form, a participation presenter-audience reaction system identified generally with the numeral 22. The purpose of the system 22 is to obtain the reaction of a viewing or listening audience 20 that may be located in a classroom, theater or auditorium to a presentation and feed the composite continuous response to the presenter at a presenter's console or lectern 21 to enable the presenter to respond to the audience and adjust his presentation accordingly.

For purposes of identification only, the members of the audience are arranged by row and seat number in a common area. In FIG. 1 the locations are identified in one direction by Rows 1 to 6 and in the other directions by Seats 1 to 7. The system is adaptable to a wide variety of audience sizes.

Figure 2A:
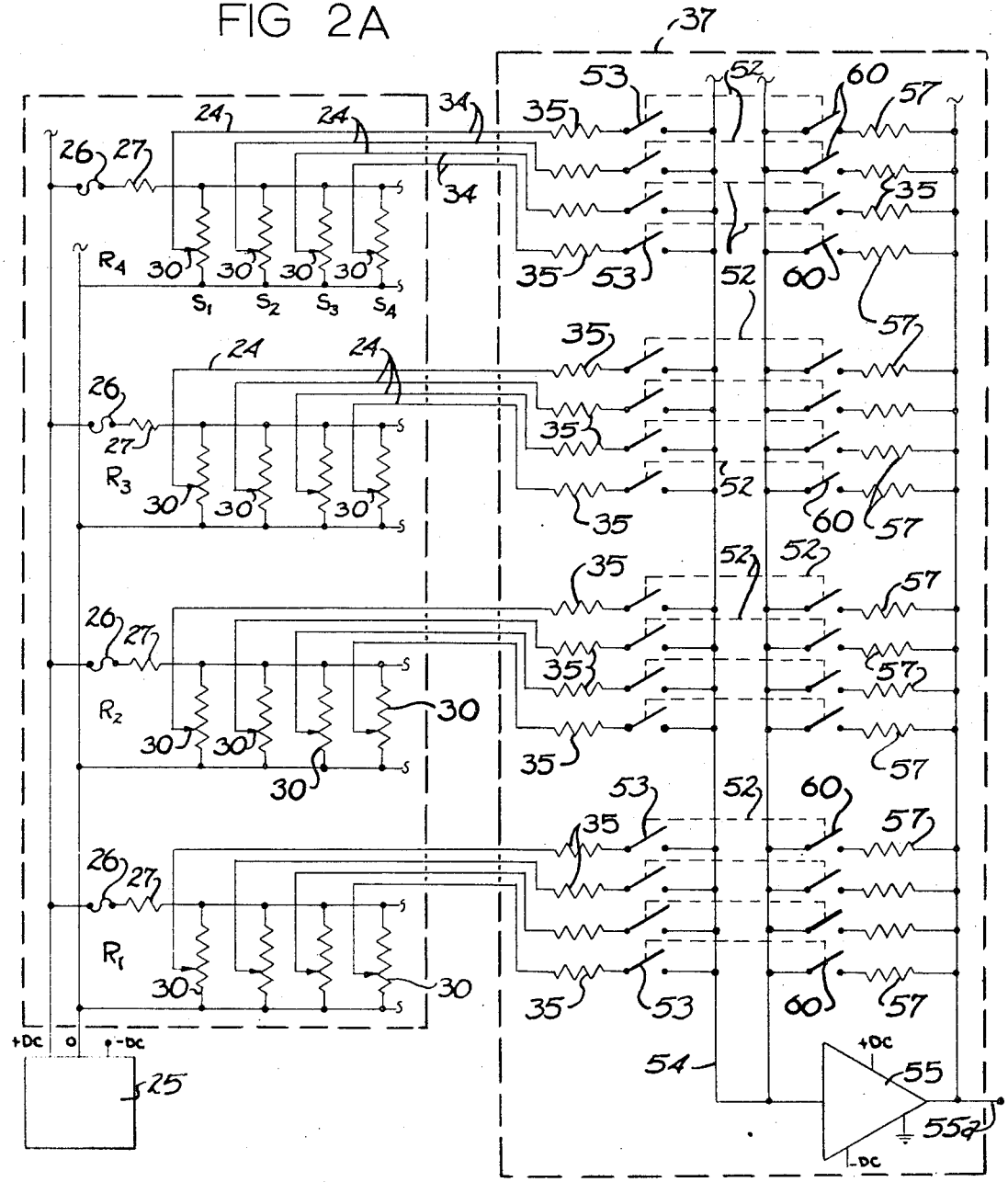
FIG. 2 A and B are fragmentary illustrative electrical schematic views of the several components that are included in the system.
Figure 2B:
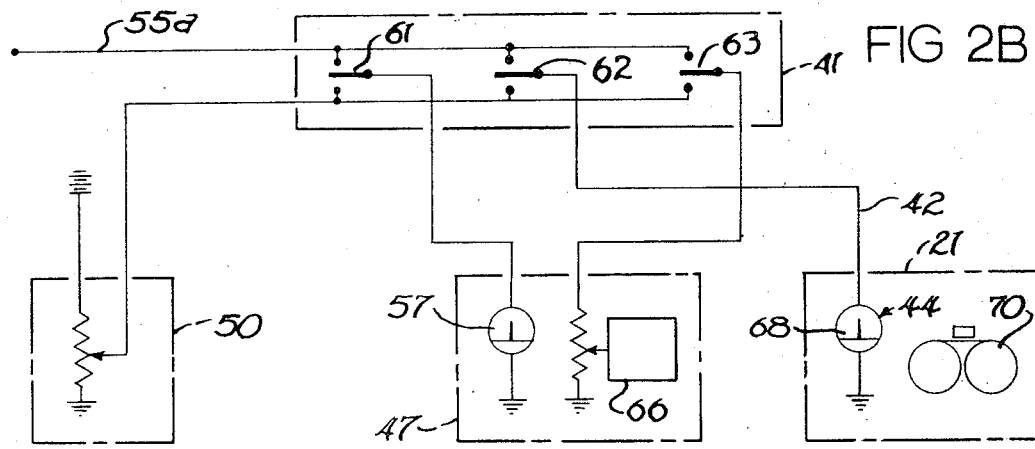

The system 22 includes a plurality of electrical response circuits 24 corresponding to the member of the audience in which a measurement or input is desired. The circuits 24 (FIG. 2 A) have a common source 25 of unidirectional electrical energy potential (D. C. voltage). Preferably the source generates a D. C. voltage of approximately 15 volts. Each response circuit 24 has an individual fuse 26 and a compensating resistor 27. The compensating resistors 27 are included to compensate for differences in the length of the line from the source to equalize the potential across manually operated potentiometers or response devices 30. The fuses 26 become effective when a short circuit occurs in a response circuit to disengage the response circuit from the system without affecting the rest of the response circuits 24.

Each response circuit 24 includes a manually operated variable resistance response device or potentiometer 30 that is distributable to each of the members of the audience.

Figure 3:
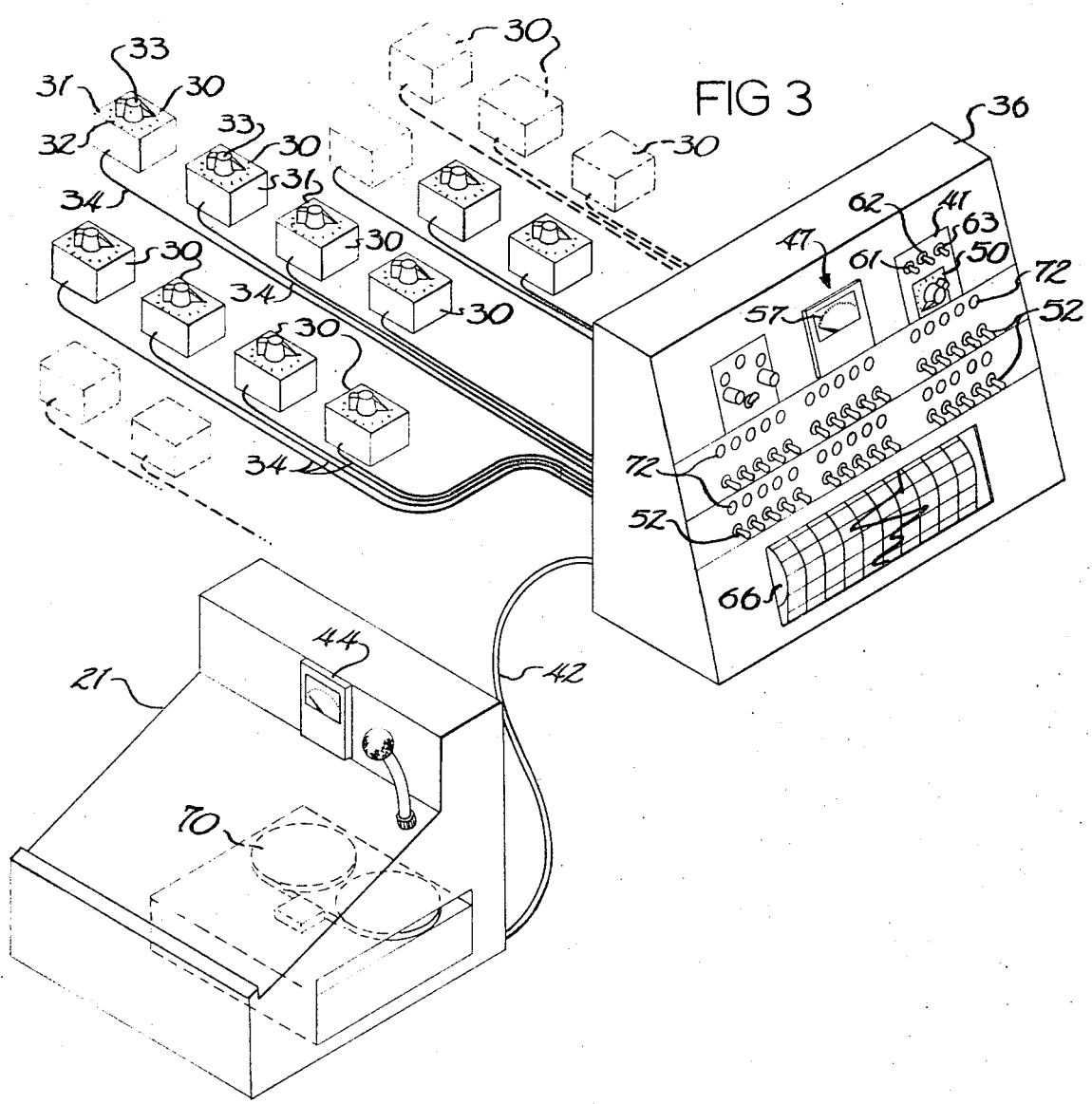
FIG. 3 is an illustrative view of the several components of the system and their general physical relationship and location with respect to each other.

Each of the response devices 30 has a case 31 (FIG. 3) that is of a shape that easily fits within the palm of an ordinary hand. The response device 30 has a selector knob 33 that is mounted in the center of a calibrated dial 32 so that the member holding the response device 30 may rotate the selector knob 33 and vary the fractional voltage (response signal) from the source in an almost infinite gradation. The fractional voltage (0-15 volts electrical signal) across the response device 30 is indicative of the continuous response of the audience member operating the selector knob 33. The calibrated dial 32 may have a wide variety of indicia printed thereon depending upon the particular use of the system 22 and the information sought. Each response circuit 24 has a line 34 that extends from the response device 30 to a control console 36 indicated by dotted line in FIG. 1 which may be spaced from the audience members. In the control console 36 each of the response circuits 24 has an input reference resistor 35 in series with the response device 30. In a preferred embodiment the resistance value of the reference input resistor 35 is at least 10 times greater than the maximum resistance value of the response device 30.

In the control console 36 the system includes a control and processing means generally referenced by the numeral 37 for selecting one or more circuits 24 and for processing the response signals of the selected response circuits and averaging the selected response signals to produce an output signal that is a composite or average value of the selected response signals. Specifically the control and processing means 37 includes a selecting means 38 for manually selecting one or more of the response circuits to apply to an averaging means 40 to average the selected response signals. The output signal passes to a selector means 41 also included in the control console 36. From the selector means 41, the output signal passes through a line 42 to display means 44 located in or on the presenter's console 21 which is positionable adjacent or in front of the presenter to enable the presenter to physically view the composite response of the selected audience.

Additionally the system includes a display and recording means 47 within the control console 36 to enable the system operator to visually receive a composite audience response and for recording the composite signal at the control console 36.

The system further includes a dummy response circuit 50 that is electrically connected to the selector means which may be forwarded to the display means 44 in lieu of the output signal from the audience to provide the presenter with a non-authentic response indication to affectuate some behavioral purpose designed by the operator. In a classroom situation it may be desirable in order to improve the presenter's confidence and self assurance, to override the response of the audience to present a more favorable indication of response. Additionally, it may be desirable to interject a dummy signal which may in turn change or modify the response indicated by the audience. The variation in utilization of such a system is almost infinite for behavioral studies and research.

The control and processing means 37 includes a plurality of individual switches 52 (FIG. 2 A) corresponding to the number of response circuits 24 which may be manually operated by a person at the control console to electrically connect the selected response circuits in parallel with each other. Specifically each of the individual switches has contacts 53 for placing the selected response circuits 24 in parallel with each other to a common line 54 connected to the averaging means 40.

In this embodiment the averaging means 40 includes an operational DC amplifier 55 that is connected to the common line 54. Also the averaging means 40 includes a plurality of feedback resistors 57 corresponding to the response circuits 24. The switches 52 have electrical contacts 60 for placing the feedback resistor 57 corresponding to the selected response circuits in parallel with the operational DC amplifier 55 to cause the operational DC amplifier 55 to operate as an averaging amplifier. There are several commercially available operational DC amplifiers that are satisfactory for this purpose. An example is the Fairchild 741 CE 6935 Unit.

One of the principal features of this invention is the requirement that the total resistance of the selected response circuits 24 be substantially equal the total effective feedback resistance applied in parallel to the operational DC amplifier 55. This may be accomplished by selecting each of the feedback resistors 57 having a resistance value substantially equal to the resistance values of the corresponding input reference resistors 35 in which the input reference resistors 35 and the feedback resistors 57 have resistance values considerably greater than the maximum resistance value of the response devices 30. For example, it has been found quite satisfactory when utilizing a DC source of 0-15 volts DC for an audience of 30 persons to select potentiometers 30 having a maximum resistance of 10 kilohms and selecting the input reference resistors 35 and the feedback resistors 57 of approximately 1 megohm in the selected test group, or greater.

Thus when an operator desires to include a member of the audience he merely closes the associated switch 52 which in turn closes the contacts 53 and 60 to apply the selected response signal to the common line 54 and connects the corresponding feedback resistor 57 in parallel with the operational DC amplifier 55 to maintain the total resistance of the selected response circuits 24 equal to the effective total feedback resistance across the operational DC amplifier. This provides a very inexpensive means of obtaining a composite average output value from the amplifier 55.

The selector means 41 includes three manually operated switches 61, 62 and 63 that are on the control console 36 for controlling the output signal from the amplifier 55 and the dummy response signal from the dummy response circuit 50. The display means 44 in a preferred embodiment includes a DC volt meter 68 mounted in the lectern or presenter's console 21. Switch 62 may be actuated to apply the dummy response signal 50 to the meter 68 or may be actuated to apply the output signal from the amplifier 55 to the meter 68.

The display and recording means 47 includes a display device or meter 57 mounted on the console 36 to enable an operator to view the composite response of the selected audience. Switch 61 directs either the dummy signal or the output signal to the meter 57. The display and recording means 47 also includes a visual recording device 66 such as a chart recorder to provide a continuous analog that permanently records the response of the audience to the presentation. The switch 63 controls the input to the chart recorder 66.

If desired a sound tape recorder 70 may be contained in the lectern 21 to record the sound performance of the presenter so that the presenter may replay the sound recording and view the chart recording and compare the two.

It may be further desirable to include light indicators on the control console 36 to indicate which response circuits or members of the audience are included in the measurements. This may be indicated by including peanut lights 72 on the control console that are illuminated when respective switches 52 are closed. The electrical connections of the lights 72 are not shown since it is quite conventional.

In an alternate embodiment, it may be desirable to obtain an average of a sub-group of the audience without disturbing or interrupting the measuring, recording and feedback of the composite response of the audience.

Figure 4:
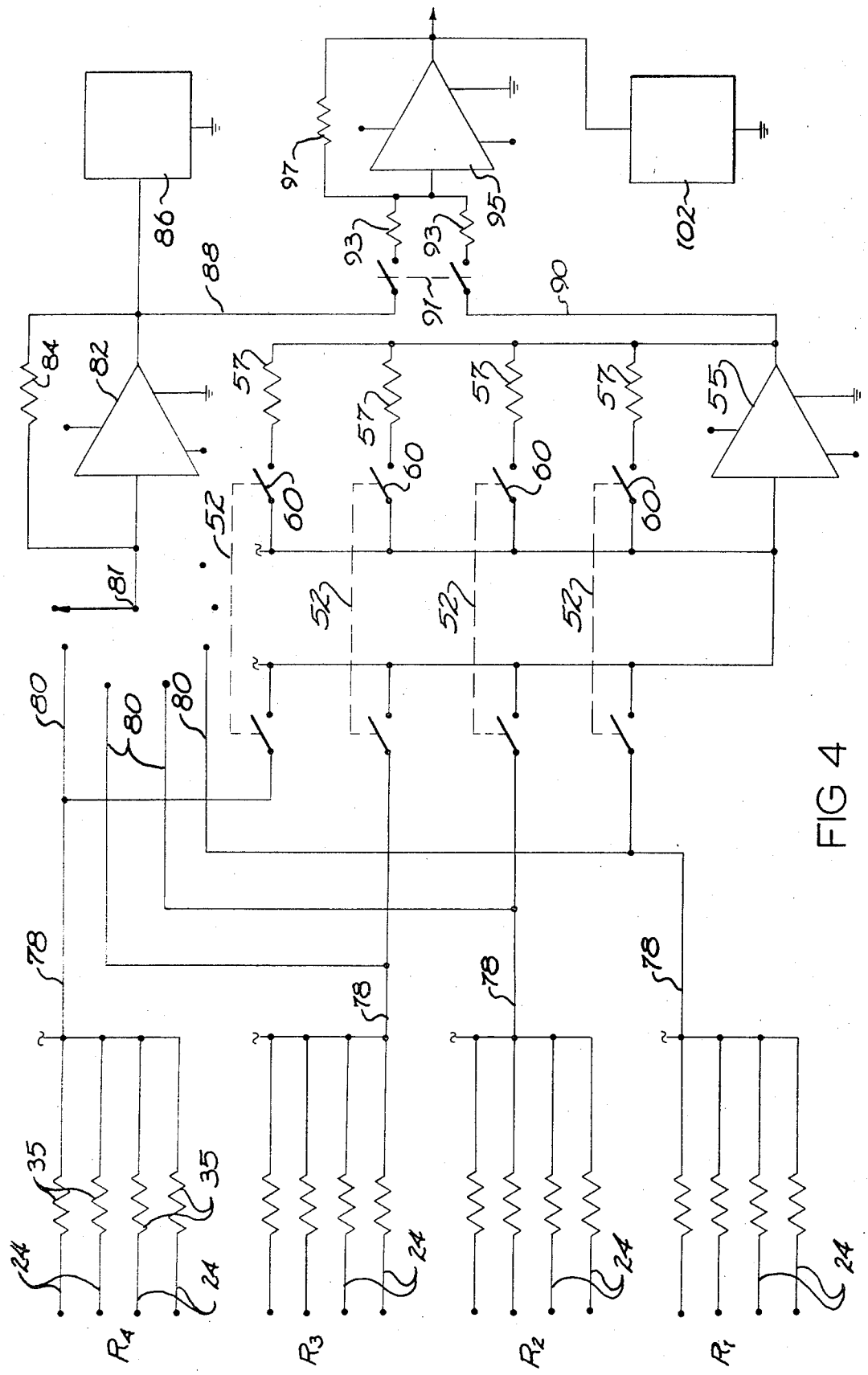
FIG. 4 is a fragmentary illustrative electrical schematic view of an alternate embodiment of this invention.

Such a system is illustrated in FIG. 4. The individual response circuits 24 containing the input reference resistors 35 are grouped into sub-groups which are identified for illustration purposes as Rows 1, 2, 3, 4 etc. The response circuits 24 fo each Row are placed in parallel with each other to a common path 78. Each common path 78 has an associated switch 52 for connecting one or more of the common paths 78 to the operational amplifier 55. Each common path 78 has an associated feedback resistor 57 which is placed in parallel with the amplifier 55 by contacts 60 of the switch 52.

Parallel lines 80 are connected in parallel to respective common paths 78 to a sub-group selector rotary switch 81. Utilizing the rotary switch 81 the operator may select any one of the Rows for sub-group averaging. The selected Row signal is fed to a sub-group operational amplifier 82. A feedback resistor 84 having a resistance value substantially equal to the total resistance of each row is placed in parallel with the amplifier 82 to average the individual response signals of the selected Row and provide a sub-group output signal in path 88. A chart recorder 86 is mounted on the control console to receive and continuously record the sub-group output signal.

The remainder of the Rows are connected in parallel through the switches 52 to the amplifier 55. The output signal from amplifier 55 is fed through path 90 to a total audience averaging amplifier 95. A double pole switch 91 is placed in paths 88 and 90. High value reference resistors 93 are also placed in lines 88 and 90 to greatly increase the resistance values of the signals from the amplifiers 82 and 55. The paths 88 and 90 are connected in parallel and fed to the total audience operational amplifier 95. A feedback resistor 97 is placed in parallel with the amplifier 95 with the resistance value of the resistor 97 substantially equal to the total resistance value of the circuit feeding the amplifier 95. The amplifier 95 averages the selected sub-group signal and the signal from the remaining Rows to provide a composite average signal of the total audience. The total audience signal is fed to the display device 44 and permanently recorded on a chart recorder 102. Thus such an inexpensive system enables the operator to sample a sub-group while at the same time displaying and recording the composite.

It should be understood that the above described embodiments are simply illustrative of the principles of the inventions, and numerous other embodiments and variations may be devised without deviating from the theme or spirit of this invention. Thus only the following claims are intended to define or limit this invention.

What we claim is:

1. A participation presenter-audience response system for selectively measuring the response of an audience to a presentation given by a presenter and for displaying the measured response within the visual view of the presenter as the presentation is being made to enable the presenter to adjust his presentation accordingly or respond to the response of the audience, said system comprising:
   a plurality of electrical response circuits;
   each of said response circuits having manually operable means individually distributable to separate members of the audience for producing an electrical response signal, the voltage magnitude of which is indicative of the relative response of the member of the presentation;
   control and processing means for selecting one or more of the electrical response circuits and for averaging the electrical response signals of the selected circuits and producing an output electrical signal having a voltage magnitude that is the average of the voltage magnitudes of the selected response signals; and
   a display means positionable in the visual view of the presenter and coupled to the control and processing means for receiving the electrical output signal and producing a visual representation depicting the average response of one or more members of the audience to the presentation as the presentation is being given to enable the presenter to adjust his presentation accordingly.

2. The response system as defined in claim 1 wherein the control and processing means includes switching means for coupling the selected response circuits in parallel so that the reciprocal of the total resistance of the selected response circuits is equal to the sum of the reciprocal of the resistance of each selected response circuits.

3. The audience response system as defined in claim 2 wherein the control and processing means includes (1) an amplified means for receiving the selected response signals and producing the output signal and (2) a plurality of feedback resistors corresponding to the response circuits; and wherein the switching means selectively couples the feedback resistors in parallel with the amplifying means so that the total resistance in parallel with the amplifying means equal the total resistance of the selected response circuits to produce an output signal that is the average of the selected response signals.

4. The audience response system as defined in claim 3 wherein each feedback resistor has a resistance value substantially equal to the resistance value of a corresponding response circuit.

5. The audience response system as defined in claim 1 wherein each response circuit includes a manually operable variable resistance device connected in series with an input reference resistor in which the resistance value of the input reference resistor is at least 10 times greater than the maximum resistance value of the variable resistance device.

6. The audience response system as defined in claim 1 wherein the display means includes a readout device mountable on a lectern positioned in front of the presenter for enabling the presenter to monitor the audience response to his presentation.

7. The audience response system as defined in claim 6 wherein the control and processing means is mounted in a control console that is separate from the lectern.

8. The audience response system as defined in claim 7 further comprising a dummy response circuit mounted in the control console having a manually operable variable resistance device for producing a dummy response signal and a selector switch mounted in the control console electrically between the control and processing means and the display means to enable an operator of the control console to terminate the output electrical signal and apply the dummy electrical signal to the display means to provide a visual representation to the presenter that is not an authentic response of any member of the audience.

* * * * *